United States Patent
Lee

(10) Patent No.: US 7,019,619 B2
(45) Date of Patent: Mar. 28, 2006

(54) POWER LINE WARNING LIGHT APPARATUS

(76) Inventor: Yu-Tuan Lee, 10F-A, No.148, Sec.2, Fu-Hsing S. Rd., Taipei 106 (TW)

( * ) Notice: Subject to any disclaimer, the term of this patent is extended or adjusted under 35 U.S.C. 154(b) by 158 days.

(21) Appl. No.: 10/642,274

(22) Filed: Aug. 18, 2003

(65) Prior Publication Data

US 2004/0085226 A1    May 6, 2004

(30) Foreign Application Priority Data

Nov. 4, 2002    (TW) .............................. 091132528 A

(51) Int. Cl.
*H04M 11/04* (2006.01)

(52) U.S. Cl. ................. 340/310.01; 340/983; 340/538; 315/200 R; 315/326

(58) Field of Classification Search .............................. 340/310.01–310.08, 983, 538, 331, 332, 340/321; 315/200 A, 200 R, 344, 326, 241, 315/159; 116/240, 202

See application file for complete search history.

(56) References Cited

U.S. PATENT DOCUMENTS

| | | | | |
|---|---|---|---|---|
| 3,202,963 A | * | 8/1965 | Flynn et al. ................. | 340/983 |
| 4,233,546 A | * | 11/1980 | Berthiaume ............. | 315/241 R |
| 4,274,084 A | * | 6/1981 | Haus ........................... | 340/326 |
| 4,474,133 A | * | 10/1984 | Anderson et al. ........... | 116/209 |
| 4,758,962 A | * | 7/1988 | Fernandes ..................... | 702/62 |
| 5,351,032 A | * | 9/1994 | Latorre et al. ......... | 340/310.01 |
| 5,654,825 A | * | 8/1997 | Milton ........................ | 359/544 |

* cited by examiner

*Primary Examiner*—Jeffery Hofsass
*Assistant Examiner*—Eric Blount
(74) *Attorney, Agent, or Firm*—Birch, Stewart, Kolasch & Birch, LLP

(57) ABSTRACT

A power line warning light apparatus is installed on power lines (electric power transmission lines), and uses the electro-magnetic coupled power from the power line to generate a periodical flashing light as a warning signal to the nearby flying vehicles to prevent collisions.

4 Claims, 1 Drawing Sheet

POWER LINE WARNING LIGHT APPARATUS

This nonprovisional application claims priority under 35 U.S.C. § 119(a) on Patent Application No(s). 091132528 filed in TAIWAN, R.O.C. on Nov. 4, 2002, which is(are) herein incorporated by reference.

BACKGROUND OF THE INVENTION

1. Field of Invention

This invention relates to a flashing light fixed on a power line. The flashing light has a set of iron core and coil, which transfer the magnetic field induced by the current in the power line to a voltage source. The voltage source further charges a capacitor in an increasing voltage charging circuit, so that the voltage on the capacitor is charged to a predetermined high voltage. The high voltage then triggers a circuit of the flashing light so as to light up a flash lamp. After the capacitor is discharged by the flash lamp, the increasing voltage charging circuit charges the capacitor again, which is for the next flashing and discharging process.

2. Related Art

Conventional power lines (electric power transmission lines) are usually hanged with pylons, and the electric power is transferred through decades, or even hundreds of kilometers from power plants to power transformer stations in cities. The pylons and power lines usually threaten the flying vehicles in low altitudes due to their heights, especially in the night or poor vision weather. Accordingly, it is one of the best caution methods to install flashing lights on the power lines as a warning marker.

SUMMARY OF THE INVENTION

Regarding the above-mentioned problem, it is an objective of the invention to provide an apparatus, which can provide a warning flashing light on a power line to caution pilots of the aviation vehicles in low altitudes. Thus, the pilots can tell the position of the power line and prevent a collision. In this invention, an annular iron core surrounds a power line, so that a magnetic flux generated by an annular magnetic field, which is induced by the current flowing in the power line, appears in the iron core. An enameled coil further winds on the iron core so as to obtain an induced voltage source promptly from two terminals of the enameled coil. Furthermore, the voltage source connects to an increasing voltage charging circuit, so as to charge a capacitor. When the voltage of the capacitor is charged to a predetermined high voltage, a flash lamp is then triggered and turned on, and the capacitor is discharged by the flash lamp at the same moment. After the capacitor is discharged and the flash lamp is turned off, the increasing voltage charging circuit charges the capacitor again for the next flash. As a result, a periodic flash can be obtained.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
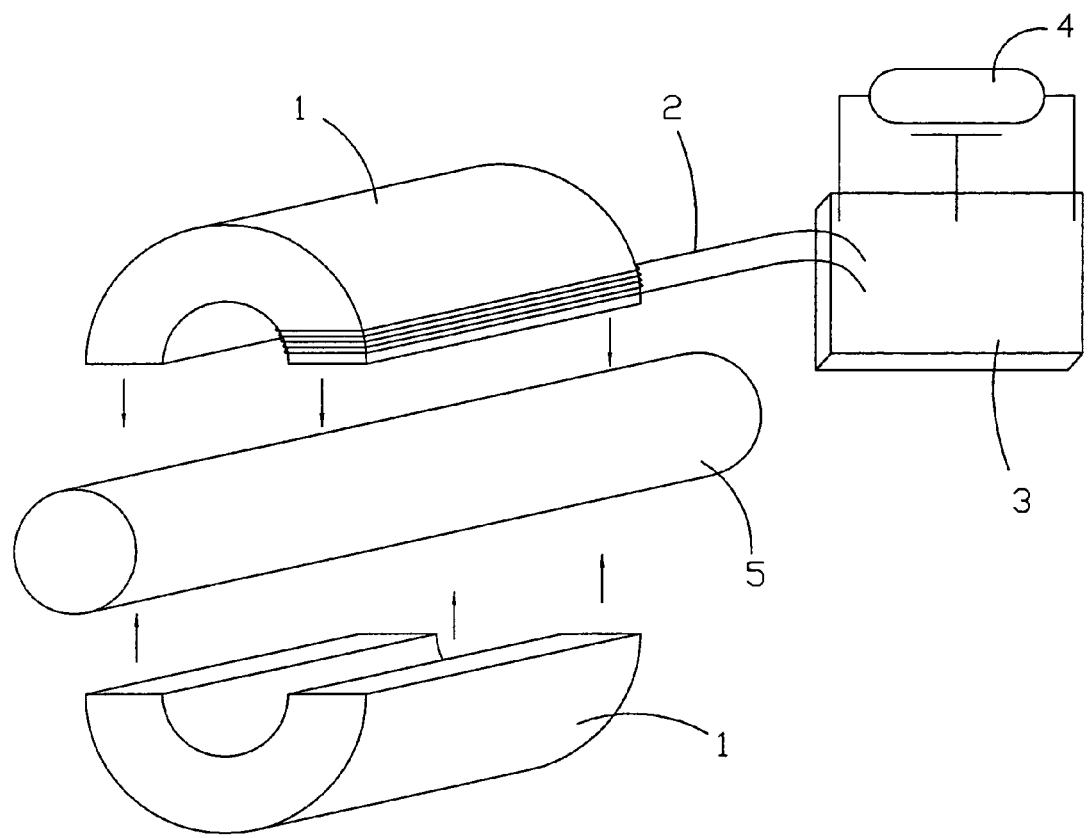
FIG. 1 is a schematic illustration showing a power line warning light apparatus according to a preferred embodiment of the invention.

Referring to FIG. 1, the power line warning light apparatus of the invention consists of an iron core 1, an enameled coil 2, an increasing voltage charging circuit 3, and a flash lamp 4. The iron core 1 surrounds over a power line 5, and the entire circuitry of the apparatus is fixed on the power line 5. Moreover, the enameled coil 2 is wound on the iron core 1. The output terminal of the enameled coil 2 is connected to the increasing voltage charging circuit 3, and the output terminal of the increasing voltage charging circuit 3 is connected to the flash lamp 4. When an alternating current is flowing in the power line 5, an annular alternating electromagnetic field is induced around the power line 5. The alternating electromagnetic field can induce a magnetic flux in the iron core 1, and a voltage on the enameled coil 2 is then obtained. The increasing voltage charging circuit 3 increases the voltage output from the enameled coil 2, and then charges the increased voltage to the flash lamp 4 to light it up.

Figure 2:
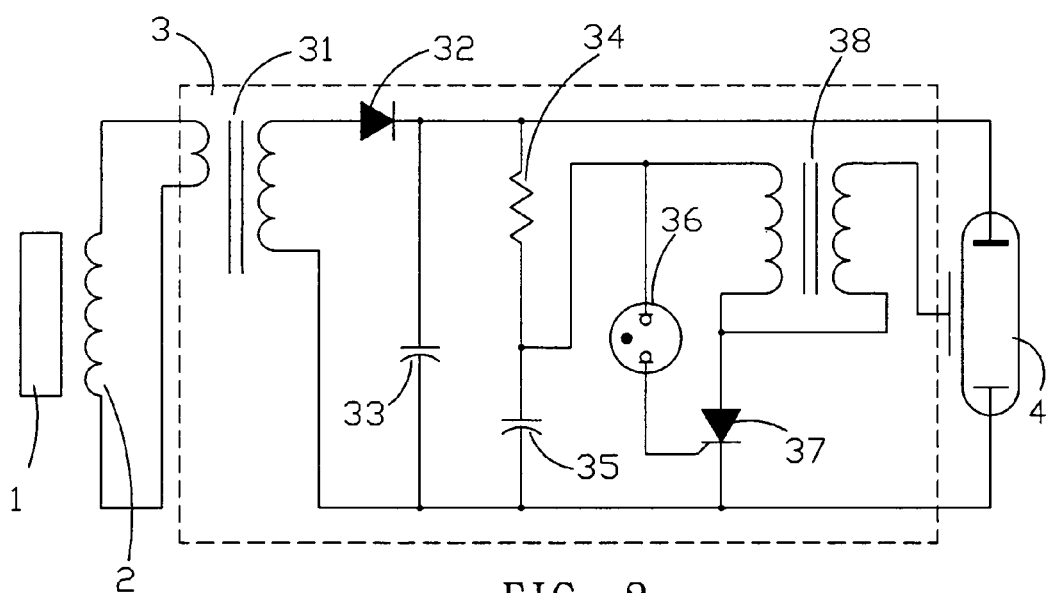
FIG. 2 is a circuit connection diagram of the power line warning light apparatus according to the preferred embodiment of the invention.

The circuit connection diagram of the power line warning light apparatus according to the preferred embodiment of the invention is shown in FIG. 2. The iron core 1 surrounds the power line 5 (as shown in FIG. 1), and the coil 2 is wound on the iron core 1. The coil connects to a charging circuit 3, which includes a transformer 31, a diode 32, a capacitor 33, a resistor 34, a capacitor 35, a neon lamp 36, a silicon controlled rectifier 37, and a transformer 38. The output terminal of the coil 2 connects to the input terminal of the transformer 31. One output terminal of the transformer 31 connects to the diode 32, and the other output terminal of the transformer 31 connects to a common ground wire of the increasing voltage charging circuit 3. The output terminal of the diode 32 connects to the capacitor 33, the resistor 34, and the flash lamp 4. The capacitor 33 and the flash lamp 4 further connect to the common ground wire, respectively. The resistor 34 further connects to the capacitor 35, the neon lamp 36, and one input terminal of the transformer 38. The capacitor 35 further connects to the common ground wire, and the neon lamp 36 further connects to the gate of the silicon controlled rectifier 37. One output terminal and the other input terminal of the transformer 38 connect to the anode of the silicon controlled rectifier 37, and the cathode of the silicon controlled rectifier 37 connects to the common ground wire. The other output terminal of the transformer 38 connects to the trigger plate of the flash lamp 4.

In the embodiment, the iron core 1 surrounds the power line 5, so that the magnetic flux is induced in the iron core 1 by the electromagnetic field around the power line as the current flows through it. Thus, a voltage can be induced at the output terminal of the coil 2, which is wound on the iron core 1. The voltage will be increased to an alternating voltage in the magnitude of about 280 volts by the transformer 31 and then output from the transformer 31. After the diode 32 and capacitor 33 rectifies and filters the output voltage from the transformer 31, a direct current (DC) voltage in the magnitude of about 400 volts is obtained finally. The DC voltage charges the capacitor 35 via the resistor 34. When the voltage of the capacitor 35 increases over 90 volts, it light up and conduct the neon lamp 36. The current through the neon lamp 36 flows to the gate of the silicon controlled rectifier 37, so as to conducts the anode and cathode of the silicon controlled rectifier 37. Consequently, a current flows to the input terminal of the transformer 38, and a high voltage output in the magnitude of 2000 to 4000 volts is then transformed with and output from the transformer 38. The high voltage is connected to the trigger plate of the flash lamp 4 and triggers the flash lamp 4 to flash. It should be noted that when the flash lamp 4 flashes, the voltage of the capacitor 33 is discharged correspondingly. Thus, the flash lamp stops flashing when the voltage of the capacitor 33 is discharged. At this moment, the neon lamp 36 is turned off and the whole circuit starts over the charge sequence for the next flash.

In summary, the power line warning light apparatus of the invention has the following advantages of:

1. It provides a high luminance flash warning to aviation vehicles in low altitudes and avoids their collisions with power lines.

2. It is driven by the power transmitted in the power line and can be used to monitor the power status. For example, no flash indicates that the current in the power line breaks off.

3. It is fixed on the power line directly, and additional equipments and power sources are unnecessary.

4. It is easy to install since the only work to do is to fix it to the power line.

5. It has a small volume and is light-weighted, which does not increase the loading of the power line significantly.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A power line warning light apparatus, comprising:
    an iron core, which annularly surrounds a power line, so that a current in the power line induces a magnetic flux in the iron core;
    a coil, which is wound on the iron core so as to generate a voltage according to the magnetic flux in the iron core;
    a charging circuit, which stores the voltage generated by the coil and generates a periodic trigger signal, wherein the charging circuit comprises:
        an increasing voltage transformer,
        a diode, which connects to an output terminal of the increasing voltage transformer, and connects to the flash lamp,
        a first capacitor, which connects to the diode,
        a resistor, which connects to the diode,
        a second capacitor, which connects to the resistor,
        a high voltage transformer, wherein an input terminal of the high voltage transformer connects to the resistor, and an output terminal of the high voltage transformer connects to a trigger plate of the flash lamp,
        a neon lamp, wherein a terminal of the neon lamp connects to the resistor, and
        a silicon controlled rectifier, wherein a gate of the silicon controlled rectifier connects to another terminal of the neon lamp, an anode of the silicon controlled rectifier connects to another input terminal of the high voltage transformer, and a cathode of the silicon controlled rectifier is grounded; and
    a flash lamp, which flashes according to the trigger signal.

2. A power line warning light apparatus, comprising:
    an iron core, which annularly surrounds a power line, so that a current in the power line induces a magnetic flux in the iron core;
    a coil, which is wound on the iron core so as to generate a voltage according to the magnetic flux in the iron core;
    a charging circuit, which stores the voltage generated by the coil and generates a periodic trigger signal, wherein the charging circuit comprises:
        an increasing voltage transformer,
        a diode, which connects to an output terminal of the increasing voltage transformer, and connects to the flash lamp,
        a first capacitor, which connects to the diode,
        a resistor, which connects to the diode,
        a second capacitor, which connects to the resistor,
        a high voltage transformer, wherein an input terminal of the high voltage transformer connects to the resistor, and an output terminal of the high voltage transformer connects to a trigger plate of the flash lamp,
        a fixed voltage triggered device, wherein a terminal of the fixed voltage triggered device connects to the resistor, and
        a silicon controlled rectifier, wherein a gate of the silicon controlled rectifier connects to another terminal of the fixed voltage triggered device, an anode of the silicon controlled rectifier connects to another input terminal of the high voltage transformer, and a cathode of the silicon controlled rectifier is grounded; and
    a flash lamp, which flashes according to the trigger signal.

3. The power line warning light apparatus of claim 2, wherein the fixed voltage triggered device is a neon lamp.

4. The power line warning light apparatus of claim 2, wherein the fixed voltage triggered device is a SCR (Silicon Controlled Rectifier) firing circuit.

* * * * *